United States Patent
Jeansonne et al.

(10) Patent No.: US 10,104,619 B2
(45) Date of Patent: Oct. 16, 2018

(54) RETRIEVAL OF A COMMAND FROM A MANAGEMENT SERVER

(71) Applicant: HEWLETT-PACKARD DEVELOPMENT COMPANY, L.P., Houston, TX (US)

(72) Inventors: Jeffrey Kevin Jeansonne, Houston, TX (US); Valiuddin Ali, Houston, TX (US); Richard A Bramley, Jr., Mansfield, MA (US); Duane J Gatlin, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 10 days.

(21) Appl. No.: 15/308,318

(22) PCT Filed: Jun. 30, 2014

(86) PCT No.: PCT/US2014/044882
§ 371 (c)(1),
(2) Date: Nov. 1, 2016

(87) PCT Pub. No.: WO2016/003414
PCT Pub. Date: Jan. 7, 2016

(65) Prior Publication Data
US 2017/0111867 A1    Apr. 20, 2017

(51) Int. Cl.
*H04W 52/02* (2009.01)
*H04L 29/06* (2006.01)
*H04L 29/08* (2006.01)
*G06F 1/32* (2006.01)

(52) U.S. Cl.
CPC ...... *H04W 52/0235* (2013.01); *G06F 1/3209* (2013.01); *H04L 67/10* (2013.01); *H04L 67/141* (2013.01); *H04L 67/18* (2013.01); *H04L 67/42* (2013.01); *Y02D 70/142* (2018.01)

(58) Field of Classification Search
CPC .. G06F 1/3203; H04W 52/0235; H04L 67/10; H04L 67/141
See application file for complete search history.

(56) References Cited

U.S. PATENT DOCUMENTS

| | | | |
|---|---|---|---|
| 5,991,806 A * | 11/1999 | McHann, Jr. ....... | H04L 41/0213 709/224 |
| 6,678,831 B1 | 1/2004 | Mustafa et al. | |
| 8,509,097 B1 | 8/2013 | Gourlay et al. | |
| 8,615,671 B2 | 12/2013 | Robles et al. | |
| 2010/0165897 A1 | 7/2010 | Sood | |
| 2011/0090883 A1* | 4/2011 | Tanaka .................. | G06F 1/3203 370/338 |

(Continued)

FOREIGN PATENT DOCUMENTS

CN    103118103    5/2003

OTHER PUBLICATIONS

"Altiris™ Client Management Suite 7.0 SP1 Release Notes"; Aug. 5, 2009; 9 pages.

(Continued)

*Primary Examiner* — Mewale A Ambaye
(74) *Attorney, Agent, or Firm* — HPI Patent Department

(57) ABSTRACT

Examples herein disclose establishing a connection from a controller in a computing device to a management server over a network. The examples retrieve a command from the management server.

13 Claims, 7 Drawing Sheets

(56) References Cited

U.S. PATENT DOCUMENTS

| | | |
|---|---|---|
| 2011/0161698 A1 | 6/2011 | Zorek et al. |
| 2011/0179298 A1* | 7/2011 | Odaohhara ............... G06F 1/26 713/323 |
| 2011/0283006 A1 | 11/2011 | Ramamurthy |
| 2011/0292807 A1 | 12/2011 | Shah et al. |
| 2012/0117401 A1* | 5/2012 | Gobriel ................ G06F 1/3209 713/320 |
| 2013/0262642 A1 | 10/2013 | Kutch |
| 2014/0181891 A1 | 6/2014 | Von Bokern et al. |

OTHER PUBLICATIONS

Dell; "The AMD Difference"; Jun. 8, 2010; 4 pages.
Intel; "New Value for Managed Service Providers: Extending OutofBand Remote Management to Servers"; Feb. 2010; 9 pages.
Microsoft System Center, System Center Configuration Manager, web page downloaded Jun. 10, 2014, 1 page, http://technet.microsoft.com/en-us/systemcenter/bb507744.aspx.

* cited by examiner

RETRIEVAL OF A COMMAND FROM A MANAGEMENT SERVER

BACKGROUND

In computing devices, out-of-band management stray allow a system administrator to monitor and manage components regardless of whether the computing device is turned on. This may involve transmitting packets to the paring device to wake a central processing unit (CPU) and operating systems to complete a task.

BRIEF DESCRIPTION OF THE DRAWINGS

In the accompanying drawings, like numerals refer to like components or blocks. The following detailed description references the drawings, wherein.

DETAILED DESCRIPTION

It may be difficult to manage mobile devices that may roam between the intranet and other various networks as the management server may not know where to reliably locate the mobile device at a given time. Additionally, these mobile devices may spend significant time in a low powered state where many hardware sub-systems, such as the central processing unit are not executing code. Such low power states may include, by way of example, standby, hibernation, sleep, and off. As such, these situations may result in the mobile device being unreachable and thus unmanageable at the given time.

To address these issues, examples disclosed herein manage a computing device through a retrieval of a command over a network. In the examples, a controller may determine whether a processor is in a low powered state. Upon determining the processor is in the low powered state, the controller may reach out over the network to a management server to retrieve the command. In these examples, the controller may remain powered on even though the processor (e.g., central processing unit and/or host processor) is in the low powered state. This enables the controller to reach out to the management server of the network to provide a status of the computing device and retrieve the command independent of the processor.

In another example discussed herein, the controller performs the command while the processor remains in the low powered state. Enabling the controller to perform the retrieved command, adds manageability to the computing device from remote locations regardless of the power state of the processor. In this manner, enabling the computing device to retrieve the commands over the network provides a pipeline for enabling communications over various types of networks.

In a further example discussed herein, the controller communicates a status of the processor and/or computing device prior to retrieval of the command. Transmitting the status of the processor prior to retrieval of the command provides an additional oversight to the computing device. This also enables the management server to determine the next action for the computing device to perform.

In summary, examples disclosed herein manage a computing device through retrieval of a command over a network. In the examples, the controller remains powered on for connecting over the network regardless of the state of the processor, thus providing an independence of managing the computing device among various networks.

Figure 1:
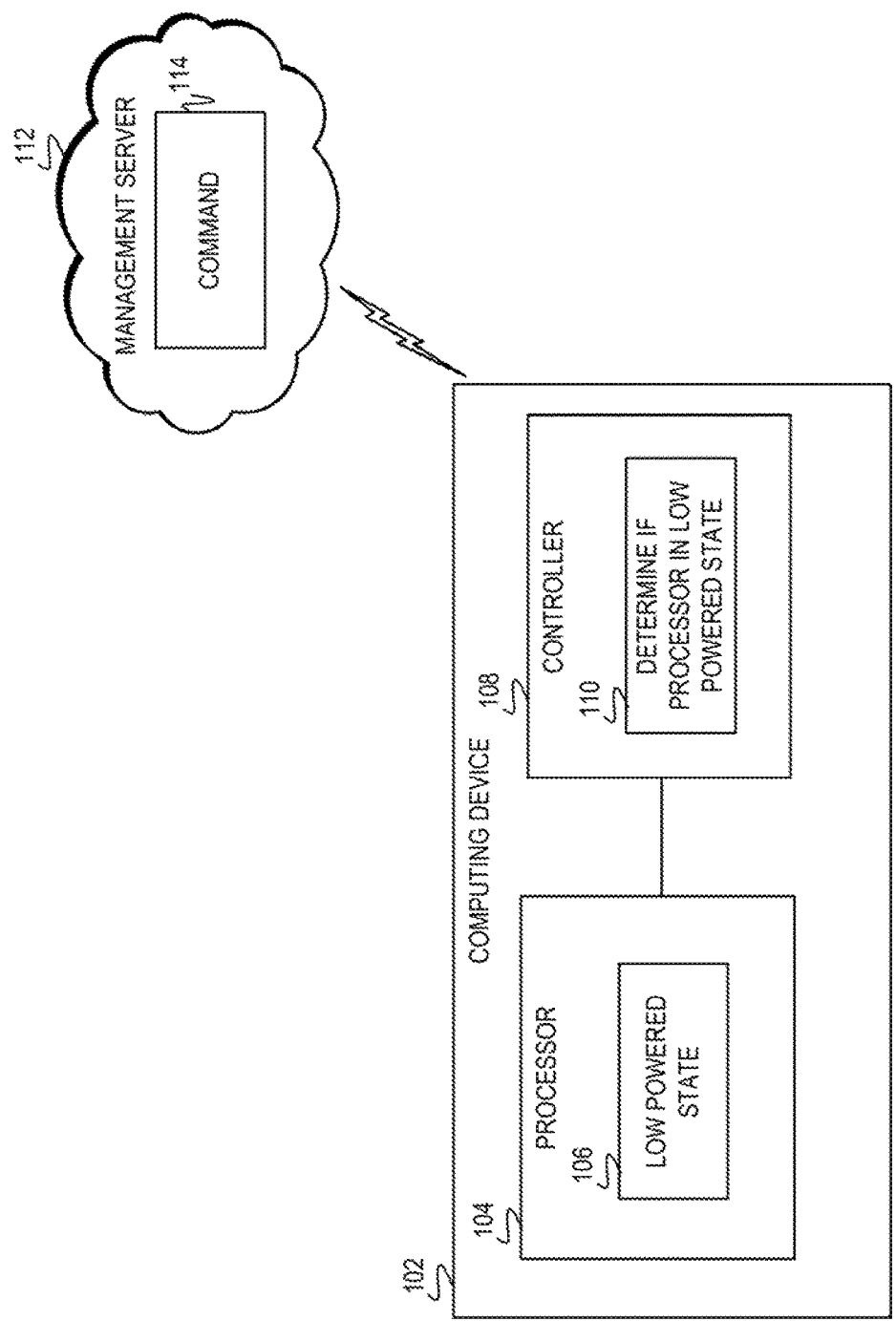
FIG. 1 is a block diagram of an example computing device with a controller to determine if a processor is in a low powered state and in response, the controller establishes a communication with a management server to retrieve a command.

Referring now to the figures, FIG. 1 is a block diagram of an example computing device 102 including a controller 108 to determine whether a processor 104 is in a low powered state 106 at module 110. In response, the controller 108 may establish a connection for communication over a network to management server 112 for retrieval of a command 114. Enabling the controller 108 to retrieve the command 114 across the network provides a management mechanism to the computing device 102 even though the computing device 102 may be roaming among various networking locations. Additionally, enabling the controller 108 to retrieve the command 114 across the network provides management of the computing device regardless of a power state of the processor 104.

The computing device 102 is an electronic device including the processor 104 and the controller 108 capable of communicating across the network to the management server 112. As such, implementations of the computing device 102 include a mobile device, client device, personal computer, desktop computer, laptop, tablet, portable device, video game console, or other type of electronic device capable of reaching out to management server 112 for retrieval of the command 114. Although FIG. 1 illustrates the computing device 102 as including hardware components 104 and 106, this was done for illustration purposes as the computing device 102 may further include a memory component, engine component, and/or networking peripherals to enable the connection over the network. Also, the computing, device 102 may communicate to the management server 112 over the network over wired or wireless connection. The network may include, by way of example, a private network, business network, local area network (LAN), wide area network (WAN), cloud network, etc. Additionally, although FIG. 1 represents the management server 112 as part of the network with the computing device 102, this was done for illustration purposes as the computing device 102 may be in a different network from the management server 112. For example, the computing device 102 may be roaming in a private network while the management server 112 may be located in a public network.

The processor 104 is a hardware component within the computing device 102 which may carry out and/or execute instructions of a computer program (e.g., an operating system) by performing the basic operations. The processor 104 is considered a main platform and/or host processor to the computing device 102 in the sense the operating system resides on the processor 104. In this manner, when the processor 104 is functioning, more power is consumed than the functioning of the controller 108. An operating system may reside at the processor 104, such that when the processor 104 may not be executing this operating system, the processor 104 may be in the low powered state 106. As such, the processor 104 may be responsible for executing the operating system and/or basic input output system (BIOS) to carry out the basic operations of the computing device 102. Implementations of the processor 104 include a main platform, host processor, central processing unit (CPU), microprocessor, semiconductor, integrated circuit, or other type of electronic device capable of carrying out and/or executing a computer program.

The low powered state 106 represents various states of powering down the processor 104 within the computing device 102. As such, the low powered state 106 occurs when the processor 104 is operating below normal functionality and thus consuming less power. For example, the low powered state 106 may include when the processor 204 ceases executing the operating system of the computing device 102. Implementations of the low powered state 106 may include by way of example, a hibernation state, sleeping state, off state, global power state such as S3-S5 as defined in the Advanced Configuration and Power Interface (ACPI) specification, etc. This implementation is discussed in detail in the next figure.

The controller 108 is a hardware component including module 110 for determining whether the processor 104 is in the low powered state 106. The controller 108 is an architecture which is independent of the operating system residing on the processor 104. The controller 108 provides additional platform capabilities to the computing device 102. For example, the controller 108 may be responsible for monitoring temperatures, controlling fans, monitoring battery charge, etc. In one implementation, the controller 108 may transmit a status of the processor 104 to the management server 112 prior to retrieving the command 114. In another implementation, the controller 108 may transmit a request to an engine to open a connection over the network to the management server 112. These implementations are discussed in detail in later figures. Once the connection, to the network is established, the controller 108 may utilize a standard protocol, such as a representation state transfer (REST) and/or javascript object notation (JSON) based protocol to check to see if a command 114 may be waiting at the management server 112 for retrieval. In a further implementation, the controller 108 may transmit a request to the management server 112. The request may include a device identifier for distinguishing the computing device 102 among other computing devices which may be in communication with the management server 112. Additionally, the request may include the knowledge of the state of the processor 104 and/or the computing device 102. Implementations of the controller 108 include an embedded controller, microcontroller, semiconductor, electronic device, microchip, chipset, or other type of controlling system capable of monitoring the processor 104 for the low powered state 106 and communicating across the network.

At module 110, the controller 108 determines whether the processor 104 is in the low powered state 106. Upon determining the processor 104 is in the low powered state, the controller 108 may transmit the request to establish the connection over the network to the management server 112. In one implementation, module 110 may include monitoring the processor 104 for the low powered state 106. Implementations of the module 110 may include an instruction, set of instructions, process, operation, logic, technique, function, firmware, and/or software executable by the controller 108 for determining if the processor 104 is in the low powered state 106.

The management server 112 is a computing device located across the network that may respond to a request to provide a network service, such as data storage. Specifically, the management server 112 enables the controller 108 to retrieve the command 114 for managing the computing device 102 independent of the processor 104. Implementations of the management server 112 include a content provider, storage provider, cloud server, local area network (LAN) server, web server, network server, file server, or other type of computing device capable of holding the command 114 for the controller 108 to retrieve for managing the computing device 102.

The command 114 is an instruction specific to the computing device 102 for the controller 108 and/or other component to perform a particular task. Upon retrieval of the command 114, the controller 108 may analyze the command 114 for determining whether the command 114 may be performed by the controller 108 or whether the controller 108 should wake sub-systems such as a basic input output system (BIOS), hypervisor, and/or the operating system at the processor 104 to carry out the command 114. For example, the command 114 may include rebooting the computing device 102, performing a memory wipe, performing a disk wipe, updating an application, etc. Enabling the computing device 102 to retrieve the command 114 across the network, provides flexibility to managing the computing device 102 over various networks. Additionally, the command 114 may be developed in a remote location thus providing additional management of the computing device 102.

Figure 2:
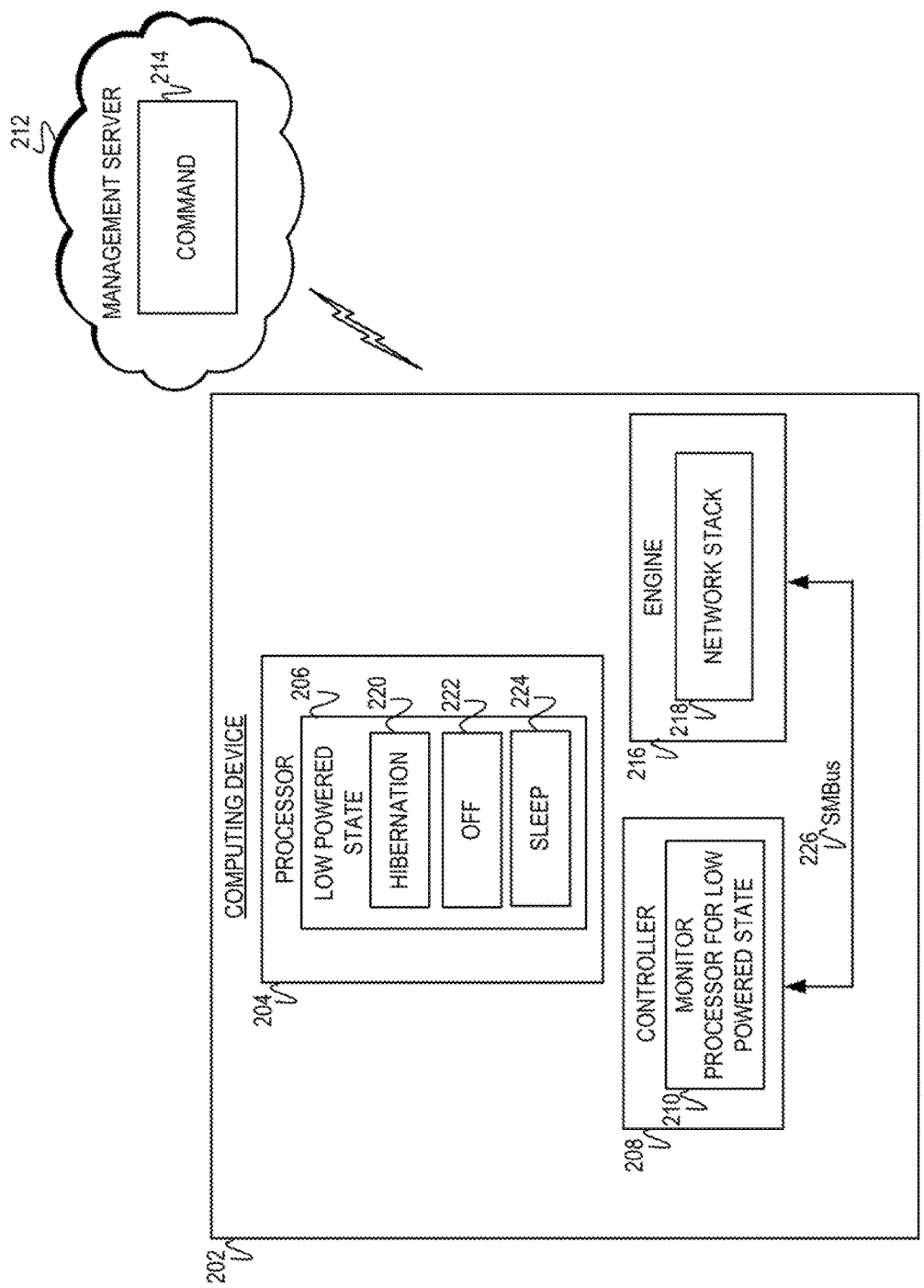
FIG. 2 is a block diagram of an example computing device including a controller to monitor when a processor enters a low powered state, the controller communicates to an engine over a system management bus (SMBus), the engine establishes a connection to a management server for retrieval of a command.

FIG. 2 is a block diagram of an example computing device 202 including a processor 204 and a controller 208 to monitor the processor 204 for one of the low powered states 206 at module 210. The low powered states 206 may include at least one of a hibernation state 220, of state 222, and sleep state 224. Upon determining the processor 204 may experience one of the low powered states 220-224, the controller 208 communicates over a system management bus (SMBus) 226 to an engine 216. The engine 216 includes a network stack 220 to establish a secure connection over a network to a management server 212 for retrieving a command 214. The command 214 may be transmitted over the secure connection through the engine 216 to the controller 208 over the SMBus 226. The computing device 202, the processor 204, and the controller 208 may be similar in structure and functionality to the computing device 102, the processor 104, and the controller 108 as in FIG. 1.

The low powered states 206 represent a power state of the processor 204 at a given time. The low powered state 206 occurs when the processor 204 is operating below normal functionality (e.g., ceases execution of an operating system at the processor 204). Each of the low powered states 206 represent the various states of powering down the processor 204 within of the computing device 202. For example, the low powered states 206 may include the hibernation state 220, the off state 222, and/or the sleep state 224. The hibernation state 220 occurs when content from the processor 204 is saved into a memory and the processor 204 is powered down. The off state 222, also referred to as a soft off, is a state in which a power supply internal to the computing device 202 supplies power at a minimum to enable a prompt full return to the normal functioning of the processor 204. The sleep state 224 is a state in which the processor 204 may stop executing instructions. In another example, the low powered states may include global power states such as S3, S4, and/or S5 as defined in the ACPI specification.

The engine 216 is a hardware component within the computing device 202 which is configured to authenticate and establish a secure connection over the network to the management server 212. The engine 216 is a separate core from the processor 204 and may be active when the processor 204 is in one or more of the low powered states 206. The engine 216 includes the network stack 218 which provides the secure connections from the computing device 202 over the network to the management server 212. Including the network stack 218 enables the controller 208 to communicate over the network independent of the processor 204. The network for establishing the connection to the management server 212 may include a wired and/or wireless connection and by way of example may include a local area network (LAN), wide area network (WAN), cloud network, Internet, wireless local area network (WLAN), etc. In this manner, the engine 216 may provide the connection over the network even when the processor 204 is in one of the low powered states 206 including hibernation state 220, the off state 222, and/or the sleep state 224. When the controller 208 monitors the processor 204 for one of the low powered states 220-224 at module 210, the controller 208 may initiate the network connection by communicating over the SMBus 226 to the engine 216. In another implementation, the engine 216 may include an application programming interface (API) to allow the controller 208 to seamlessly use the connection over the network.

The network stack 218 is a protocol stack in an implementation of computer networking. Each protocol module within the network stack 220 communicates with other protocol modules and as such may operate as layers in the network stack 220. The layers enable the communication over the network and as such, the network stack 218 may include a physical layer, data link layer, network layer, transport layer, session layer, presentation layer, application layer, media layer, etc. Including the network stack 218 enables the controller 208 to communicate over the network independent of the processor 204. The network stack 218 includes device drivers and other components to configure the networking peripherals on the computing device 202 to communicate over the network.

The SMBus 226 is a single-ended two-wire bus for communications between the controller 208 and the engine 216. In one implementation, the controller 208 communicates to the engine 216 over the SMBus 226 using an industry standard such as a standard management component transport protocol (MCTP). In this implementation, the MCTP was designed to support intra-platform communications between the controller 208 and the engine 216. The controller 208 communicates over the SMBus 226 using MCTP to call out one or more APIs on the engine 216 to establish the connection over the network.

The management server 212 is a computing device located across the network that may respond to requests to provide a network service. The management server 212 provides a mechanism for the controller 208 to reach out to it for retrieval of the command 214, independent of the processor 204. As such, the management server 212 provides the capability for managing the computing device 202 regardless of the location and/or power state of the computing device 202. The command 214 is an instruction for the computing device 202 to perform a particular task. In one implementation, the controller 208 may perform the command 214 without waking a sub-system to the processor 204. In another implementation, the command 214 may drive a task for the BIOS and/or hypervisor. These implementations are discussed in detail in a later figure. The management server 212 and the command 214 may be similar in structure and functionality to the management server 112 and the command 114 as in FIG. 1.

Figure 3:
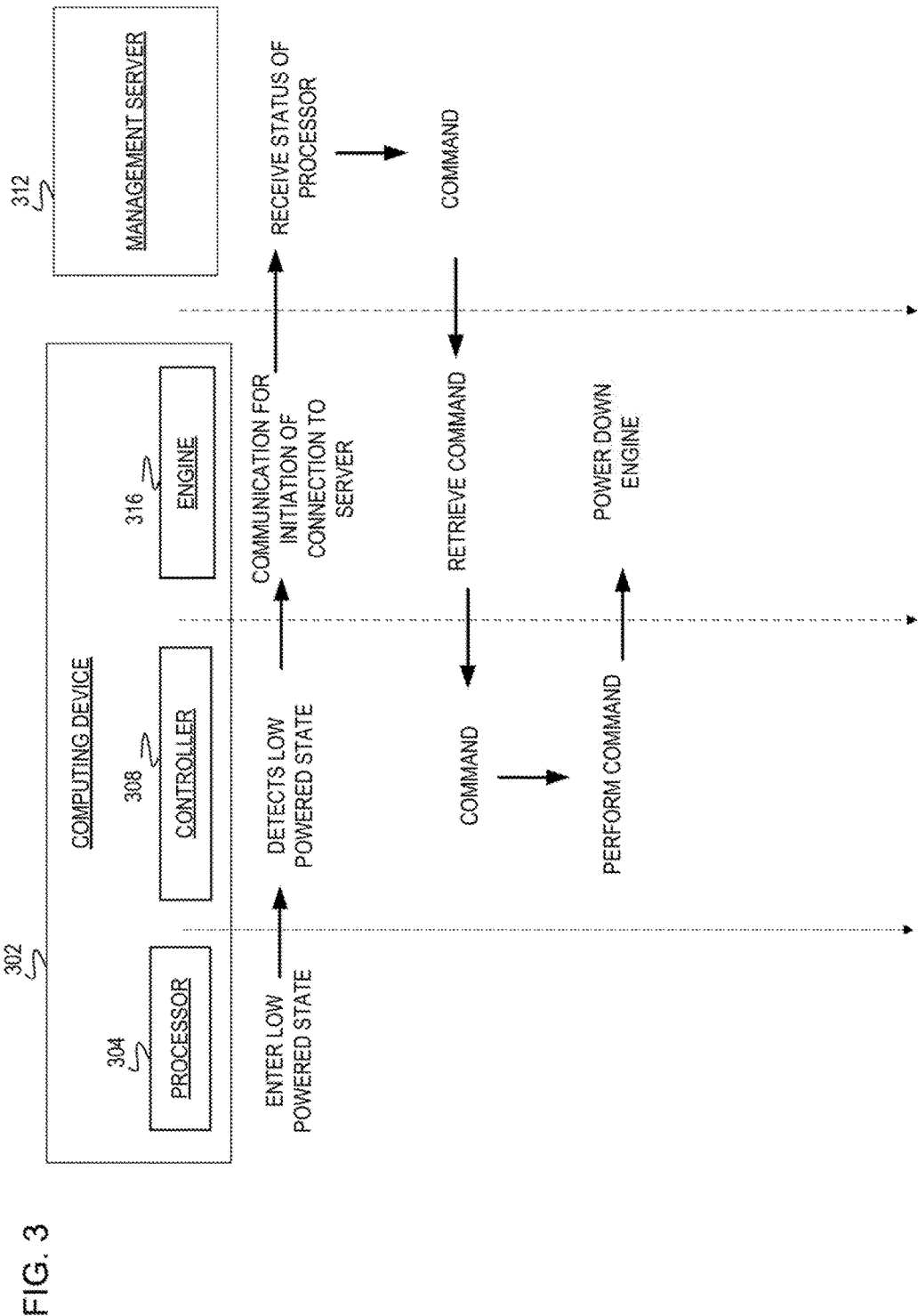
FIG. 3 is a block diagram of example communications between a computing device and a management server, the computing device includes a processor, a controller, and an engine for communications to the management server.

FIG. 3 is a block diagram of example communications between a computing device 302 and a management server 312 over a network. The computing device 302 includes a processor 304 which enters a low powered state and a controller 308 which detects the low powered state and communicates to an engine 316. The engine 316 establishes the connection to the management server 312. Upon establishing the connection to the management server 312, the controller 308 may transmit a request through the engine 316 to retrieve a command. The computing device 302 and the processor 304 may be similar in structure and functionality to the computing device 102 and 202 and the processor 104 and 204 as in FIGS. 1-2. The controller 308 and the management server 312 may be similar in structure and functionality to the controller 108 and 208 and the management server 312 as in FIGS. 1-2. The engine 316 may be similar in structure and functionality to the engine 216 as in FIG. 2.

The controller 308 detects when the processor 304 may enter the low powered state and communicate to the engine 316 for the initiation of the connection over the network. The controller 308 transmits a request to the engine 316 which may include a device identifier of the computing device 302 and the status of the processor 304. As such, the engine 316 opens the connection over the network to the management server 312. The management server 312 includes the command which may be identified through the device identifier sent as part of the request from the controller 308. The computing device 302 retrieves the command from the management server for the controller 308 to analyze for determining whether the command is task for the controller 308 to perform or whether to wake up sub-systems from the processor 304 to complete. In one implementation, the controller 308 may perform the command without waking the operating system residing on the processor 304. Upon performance of the command, the controller 308 communicates to the engine 316 to power down.

Figure 4:
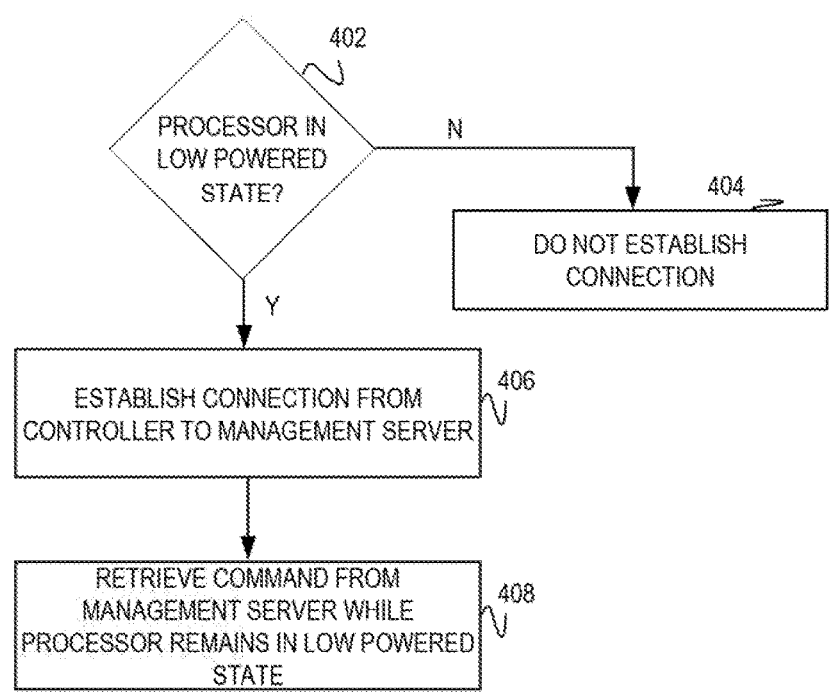
FIG. 4 is a flowchart of an example method to determine when a processor in a low powered state and in response establish a connection to a management server for retrieval of a command from the management server while the processor remains in the low powered state.

FIG. 4 is a flowchart of an example method to determine when a processor is in a low powered state and in response establish a connection over a network to a management server. Upon establishing, the connection for retrieval of a command from the management server, the processor may remain in the low powered state. In discussing FIG. 4, references may be made to the components in FIGS. 1-2 to provide contextual examples. For example, the controller 108 and 208 as in FIGS. 1-2 executes operations 402-408 for retrieving the command over the network while the processor remains in the low powered state. In another example, the computing, device 102 and 202 as in FIGS. 1-2 executes operations 402-408. Further, although FIG. 4 is described as implemented by the controller and/or the computing device, it may be executed on other suitable components. For example, FIG. 4 may be implemented in the form of executable instructions on a machine-readable storage medium 604 and 704 as in FIGS. 6-7.

At operation 402, the controller determines if the processor is in the low powered state. At operation 402, the controller may be running a real time operating system which may run tasks in isolated execution and memory. One of the tasks may include knowledge of the processor's power states. Thus after the processor transitions into one of the low powered states, the controller uses this knowledge to detect one of the low powered states. In one implementation, upon determining the processor is in the low powered state, the controller may proceed to operation 406 for establishing a connection over the network. If the controller determines the processor is not in the low powered state, the controller proceeds to operation 404 and does not establish the connection over the network.

At operation 404, upon determining the processor is not in the low powered state, the controller does not establish the connection over the network. In one implementation, the controller may continue monitoring the processor to determine when the processor may be experiencing the low powered state. In other embodiments described in detail later, the state of the processor may be inconsequential to establishing the connection far the controller over the network. These implementations are explained in detail in the next figure.

At operation 406, the controller initiates the establishment of the connection over the network. In implementations, the connection over the network may be triggered periodically or by an event. For example, the controller may periodically attempt to establish the connection over the network. In another example, the establishment of the connection is triggered by the event, such as the processor entering the low powered state as at operation 402. The controller may communicate to an engine for initiating a secure communication connection to the management server. The controller transmits a signal to the engine for implementing a network stack internal to the engine. Also, the engine initiates the network stack for interfacing with network peripherals. In another implementation, the controller implements the network stack which interfaces directly with the network peripherals. The controller may transmit request through the engine to the management server for a job or command. This request may include a device identifier to identify the computing device. This enables the retrieval of the command from the management server as at operation 408. Once the connection of the network is established, the controller may utilize a standard protocol, such as a representation state transfer (REST) and/or javascript object notation (JSON) based protocol to check to see if a command may be waiting at the management server for retrieval at operation 408. Additionally, the controller may transmit the knowledge of the state of the processor the management server.

At operation 408, the controller retrieves the command over the network. Upon retrieving the command at operation 408, the controller processes the command to determine whether for performance, the command may be processed directly or performed by other sub-systems, such as the BIOS and/or hypervisor. As such, the controller may include a number of responses. Such responses to the retrieval of the command may include, by way of example, to remain in the existing state of the processor (i.e., perform no task), perform the command, wake the processor and basic input output system (BIOS) residing on processor to perform the command, and/or wake the processor for a hypervisor to perform the command. The controller may then proceed to perform the command itself or wake the relevant subsystem to perform the command.

Figure 5:
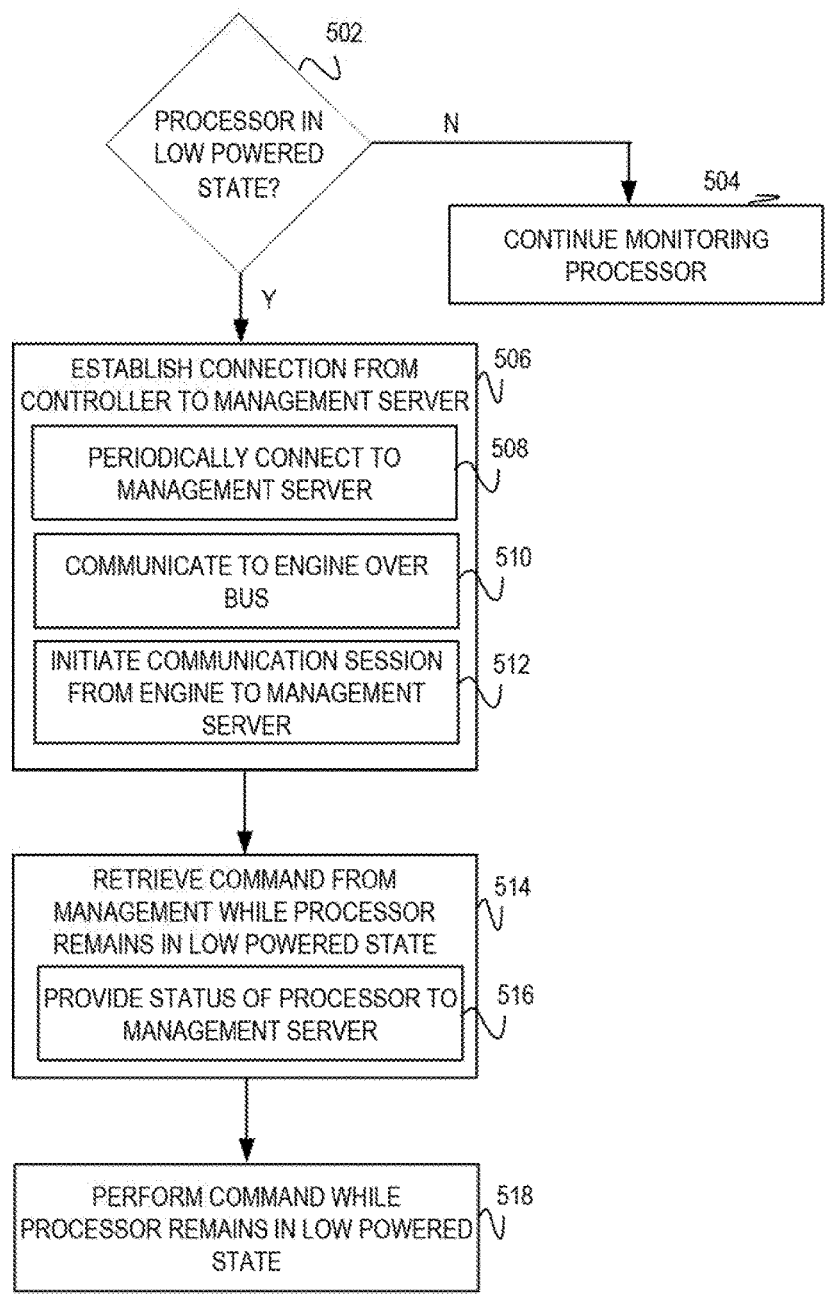
FIG. 5 is a flowchart of an example method to determine when a processor is in a low powered state and retrieve a command from the management server for performance while the processor remains in the low powered state.

FIG. 5 is a flowchart of an example method to determine when a processor is in a low powered state and retrieve a command over a network from a management server. Performance of the command may occur while the processor remains in the low powered state. Enabling the controller to perform the command retrieved over the network, adds manageability to the computing device from remote locations even though the processor may be in the lower powered state. In this manner, enabling the computing device to retrieve the commands over the network provides a pipe for enabling communications over various types of networks. In discussing FIG. 5, references may be made to the components in FIGS. 1-2 to provide contextual examples. For example, the controller 108 and 208 as in FIGS. 1-2 executes operations 502-518 for retrieving the command over the network while the processor remains in the low powered state. In another example, the computing device 102 and 202 as in FIGS. 1-2 executes operations 502-518. Further, although FIG. 5 is described as implemented by the controller and/or the computing device, it may be executed on other suitable components. For example, FIG. 5 may be implemented in the form of executable instructions on a machine-readable storage medium 604 and 704 as in FIGS. 6-7.

At operation 502, the controller may detect when the processor is experiencing the low powered state. The low powered state occurs when the processor is operating below normal functioning and as such may include, by way of example, a sleeping state, powered off state, hibernation state, standby state, etc. In another example, the low powered states may include global power states such as S3, S4, and/or S5 as specified in the ACPI specification. In one implementation, if the controller determines the processor is not in one of the low powered states, the controller continues to monitor the processor as at operation 504. In this implementation, if the controller determines the processor is in one of the low powered states, the controller may proceed to operation 506 to establish the connection over the network. Operation 502 may be similar in functionality to operation 402 as in FIG. 4.

At operation 504, upon determining the processor is not in one of the low powered states, the controller continues monitoring the processor. In another implementation, the controller may periodically check the processor for the low powered states.

At operation 506, the controller establishes the connection over the network to the management server through the engine. Operation 506 may include establishing a secure connection over the network to the management server. The controller may utilize a network stack internal to the engine which may include using firmware extensions. Using the network stack internal to the engine to generate the secure connection to the management server enables the controller to utilize the engine to provide the secure connection rather than using a transmission control protocol stack internal to the controller. In another implementation, the controller communicates the request to the engine to obtain the command from the management server. The controller may communicate over the SMBus to the engine using, a management component transport protocol (MCTP). The request to the engine includes an initiation of the secure connection and the device identifier for the management server to identity the computing device from other computing devices. Operation 506 may be similar in functionality to operation 406 as in FIG. 4.

At operation 508, the controller may periodically connect to the management server to establish the connection. In this implementation, the controller may periodically check the management server to identify whether the management server has the command for the computing device. For example, after a particular time period has passed, the controller may attempt a connection over the network to the management server.

At operation 510, the engine communicates the request from the controller out over the network to the management server. Operation 510 may include the engine configuring the network hardware to initiate the secure connection to the management server. For example, the engine may configure a network stack and/or port in which to transmit the communication out of the computing device across the network.

At operation 512, the controller communicates to the engine for initiating the communication session from the mine to the management server. In one implementation, the controller transmits a request to the engine over the SMBus for establishing the secure session over the network. The controller transmits the request to retrieve the command to the engine which in turn forwards the request to the management server. By way of example, this request may include the device identifier to identify the computing device from other computing device commands at the management server. In turn the management server uses the device identifier to retrieve the command and then transmits the command to the engine. The engine forwards the command to the controller which analyzes the command and as such, may determine whether the command may be performed by the controller by itself or may wake sub-systems to carry out the command. For example, the controller may reboot the computing device, but may wake the sub-systems including the BIOS to perform a wipe of memory.

At operation 514, the controller may retrieve the command from the management server. The management server may utilize the device identifier transmitted as part of the request at operations 506-512 to identify the specific command for that particular computing device. The management server may transmit the command across the connection back to the computing device for the controller. Operation 514 may be similar in functionality to operation 408 as in FIG. 4.

At operation 516, upon establishing the connection from the controller to the management server at operations 506-512, the controller may transmit the state of the processor as part of the request to the management server. In this manner, the controller uploads the status of the processor to the management server prior to the retrieval of the command. Transmitting the status of the processor prior to retrieval of the command provides an additional oversight to the computing device. Additionally, in this implementation, the management server may determine the next action for the computing device to perform.

At operation 518, the controller may perform the command retrieved at operation 514. The controller may perform the command without waking the operating system residing on the processor. In this manner, the controller performs the command while the processor may remain in the low powered state. The controller may perform a number of responses upon retrieving the command. Such responses may include, by way of example, to remain in the existing state of the processor (i.e., perform no task), perform the command, wake the processor and basic input output system (BIOS) residing on processor to perform the command, and/or wake the processor for a hypervisor to perform the command. In one implementation, upon performing the command, the controller may transmit the request to the engine to terminate the connection over the network to the management server. Upon terminating the connection, the engine may power down and enter one of the low powered states.

Figure 6:
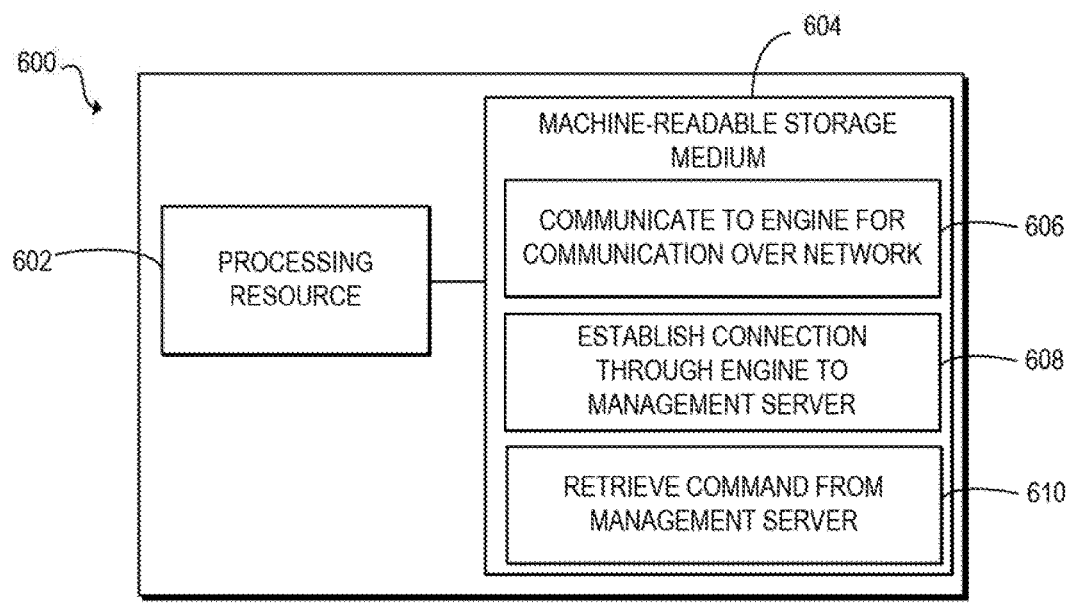
FIG. 6 is a block diagram of an example computing device with a processor to execute instructions in a machine-readable storage medium for communicating an engine over communication over a network and retrieving a command from over the network.

FIG. 6 is a block diagram of computing device 600 with a processor 602 to execute instructions 606-610 within a machine-readable storage medium 604. Specifically, the computing device 600 with the processor 602 is to communicate to an engine for establishing a connection to management server over a network for retrieval of a command. Although the computing device 600 includes processing resource 602 and machine-readable storage medium 604, it may also include other components that would be suitable to one skilled in the art. For example, the computing device 600 may include the engine 216 and 316 as in FIGS. 2-3. The computing device 600 is an electronic device with the processing resource 602 capable of executing instructions 606-6100 and as such embodiments of the computing device 600 include a computing device, mobile device, client device, personal computer, desktop computer, laptop, tablet, video game console, or other type of electronic device capable of executing instructions 606-610. In another implementation, the computing device 600 may be similar in structure and functionality to computing device 102, 202, and 302 as in FIGS. 1-3. The instructions 606-610 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-610 for establishing the connection to the management server for retrieval of the command. The processing resource 602 executes instructions 606-610 to: communicate to the engine to establish a communication link over a network to the management server; establish the connection to the management server over the network; and upon establishing the connection over the network, retrieve the command from the management server. In one implementation, the processing resource 602 may be similar in structure and functionality to the controller 108, 208, and 308 as in FIGS. 1-3. As such implementations of the processing resource 602 include a microcontroller, embedded controller, electronic device, microchip, chipset, electronic circuit, semiconductor, or other type of processing resource capable of executing instructions 606-610.

The machine-readable storage medium 604 includes instructions 606-610 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Figure 7:
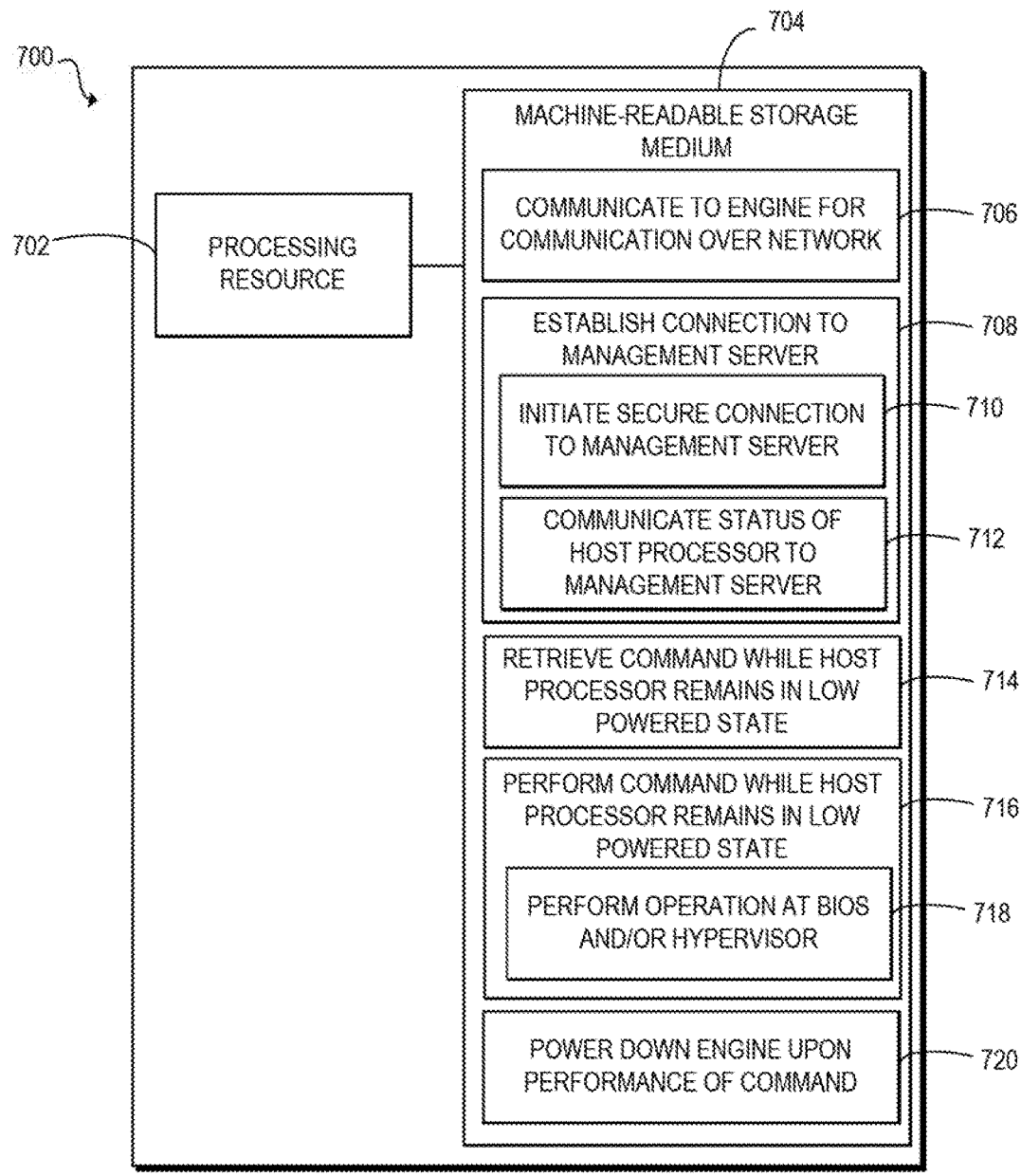
FIG. 7 is a block diagram of an example computing device with a processor to execute instructions in a machine-readable storage medium for establishing a connection with a management server for retrieval of a command and upon performing the command, powering down an engine.

FIG. 7 is a block diagram of computing device 700 with a processing resource 702 to execute instructions 706-720 within a machine-readable storage medium 704. Specifically, the processing resource 702 is to execute instructions 706-720 for establishing a connection to a management server over a network to retrieve a command while a host processor is in a low powered state. Additionally, upon performing the command, the host processor remains in the low powered state and the engine is powered down. Although the computing device 700 includes processing resource 702 and machine-readable storage medium 704, it may also include other components that would be suitable to one skilled in the art. For example, the computing device 700 may include the engine 216 as in FIG. 2. The computing device 700 may be similar in structure and functionality to the computing device 600 as in FIG. 6. In another implementation, the computing device 700 may be similar in structure and functionality to computing device 102, 202, and 302 as in FIGS. 1-3. The instructions 706-720 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory).

The processing resource 702 may fetch, decode, and execute instructions 706-720 for establishing the connection to the management server for retrieval and/or performance of the command. In one implementation, upon executing instruction 706, the processing resource 702 executes instruction 708 by executing instructions 710-712. In another implementation, upon executing instructions 706-712, the processing, resource 702 executes instruction 714-720. The processing resource 702 executes instructions 706-712 to: communicate to the engine for communication over the network; establish the connection to the management server over the network; initiate a secure connection to the management server through using a network stack on the engine; and communicating a status of the host processor to the management server prior to retrieving the command. The processing resource 702 executes instructions 714-720 to: retrieve the command from the management server while the host processor is in a low powered state; perform the command while the host processor remains in the low powered state by performing an operation at the BIOS and/or hypervisor; and upon performance of the command, powering down the engine. The processing resource 702 may be similar in structure and functionality to the processing resource 602 as in FIG. 6.

The machine-readable storage medium 704 includes instructions 706-720 for the processing resource 702 to fetch, decode, and execute. In another embodiment, the machine-readable storage medium 704 may be an electronic, magnetic, optical, memory, storage, flash-drive, or other physical device that contains or stores executable instructions. Thus, the machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 704 may include an application and/or firmware which can be utilized independently and/or in conjunction with the processing, resource 702 to fetch, decode, and/or execute instructions of the machine-readable storage medium 704. The application and/or firmware may be stored on the machine-readable storage medium 704 and/or stored on another location of the computing device 700.

In summary, examples disclosed herein manage a computing device through retrieval of a command over a network. In the examples, the controller remains powered on for connecting over the network regardless of the state of the processor, thus providing an independence of managing the computing device among various networks.

We claim:

1. A computing device comprising:
a processor to enter a low powered state;
a system management bus (SMBus);
a controller to:
determine if the processor is in the low powered state; and
if the processor is in the low powered state, transmit via the SMBus a request to an engine to establish a secure connection to a management server from the controller; and
retrieve a command from the management server over a network via the secure connection, wherein the processor remains in the low powered state, wherein the command includes performing an operation involving a basic input output system (BIOS) without waking an operating system residing on the processor.

2. The computing device of claim 1, wherein the secure connection is established regardless of a network location of the computing device.

3. The computing device of claim 1 wherein the controller is further to:
perform the command while the processor remains in the low powered state.

4. A method, executable by a computing device, the method comprising:
upon a determination a processor in the computing device is in a low powered state:
transmitting via a system management bus (SMBus) a request to an engine to establish a secure connection to a management server from a controller; and
establishing the secure connection from the controller in the computing device to the management server over a network; and
retrieving a command from the management server via the secure connection, wherein the processor remains in the low powered state, wherein the command includes performing an operation involving a basic input output system (BIOS) without waking an operating system residing on the processor.

5. The method of claim 4 further comprising:
determining if the processor is in the low powered state;
upon the determination the processor is not in the low powered state, monitoring the processor for the low powered state.

6. The method of claim 4 wherein retrieving the command from the management server comprises:
connecting to the management server periodically for retrieval of the command; and
providing a status of the processor to the management server prior to retrieval of the command.

7. The method of claim 4 wherein the low powered state of the processor includes at least one of a hibernation state of the computing device, an off state of the computing device, and a sleep state of the computing device.

8. The method of claim 4 wherein establishing the connection from the controller in the computing device to the management server over the network comprises:
  initiating a communication session from the engine to the management server.

9. The method of claim 4 further comprising:
  performing the command on the computing device while the processor remains in the low powered state.

10. A non-transitory machine-readable storage medium comprising instructions that when executed by a processing resource cause a computing device to:
  communicate via a system management bus (SMBus) a request to an engine to establish a secure connection to a management server from a controller;
  establish the secure connection from the management server to the controller through the engine; and
  retrieve a command from the management server via the secure connection, wherein the command includes performing an operation involving a basic input output system (BIOS) without waking an operating system residing on a host processor.

11. The non-transitory machine-readable storage medium including the instructions of claim 10 and further including instructions that when executed cause the computing device to:
  perform the command while the host processor remains in a low powered state; and
  power down the engine upon performance of the command.

12. The non-transitory machine-readable storage medium including the instructions of claim 10 wherein the command includes performing an operation involving at least the BIOS and hypervisor without waking the operating system residing on the host processor.

13. The non-transitory machine-readable storage medium including the instructions of claim 10, including further instructions to establish the connection to the management server through the engine by communicating a status of the host processor to the management server prior to retrieval of the command.

* * * * *